(12) United States Patent
Sakai

(10) Patent No.: US 7,249,807 B2
(45) Date of Patent: Jul. 31, 2007

(54) VEHICLE BRAKING FORCE CONTROL DEVICE WITH FEEDBACK COMMUNICATION BETWEEN WHEELS

(75) Inventor: Hideki Sakai, Susono (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 10/846,675

(22) Filed: May 17, 2004

(65) Prior Publication Data
US 2004/0245850 A1 Dec. 9, 2004

(30) Foreign Application Priority Data
Jun. 3, 2003 (JP) ............................. 2003-158214
Sep. 18, 2003 (JP) ............................. 2003-326194

(51) Int. Cl.
*B60T 8/00* (2006.01)
(52) U.S. Cl. .................. 303/112; 303/155; 188/181 T
(58) Field of Classification Search ................ 303/112, 303/155, 152, 157, 15; 188/181 T
See application file for complete search history.

(56) References Cited

U.S. PATENT DOCUMENTS 5,577,812 A * 11/1996 Hirano et al. ............... 303/112
6,267,454 B1 * 7/2001 Takahashi .................. 303/9.71
6,595,599 B2   7/2003 Soga
6,607,253 B1 * 8/2003 Yamamoto et al. .......... 303/112
2002/0180266 A1 * 12/2002 Hara et al. .................. 303/152

FOREIGN PATENT DOCUMENTS

JP           6229270 A   *  8/1994
JP    2001191903 A   *  7/2001

* cited by examiner

Primary Examiner—Melody M. Burch
(74) Attorney, Agent, or Firm—Oliff & Berridge, PLC (57) ABSTRACT

A vehicle braking force control device for executing a follow-up (or servo) control of braking force for individual wheels is improved for canceling the difference of braking force between left and right wheels especially during transient condition of braking force variation due to the difference of input-output response characteristics in braking force generating apparatuses and components associated therewith in a braking system. In the inventive control device, a relation between actual values of braking force on left and right wheels, such as the difference between braking force or pressure values on the left and right wheels, is fed back to these braking force generating apparatuses through the modification of target barking force or pressure values. The modification amounts of the target values may be determined so as to keep appropriate braking force distribution among front and rear wheels.

19 Claims, 5 Drawing Sheets

VEHICLE BRAKING FORCE CONTROL DEVICE WITH FEEDBACK COMMUNICATION BETWEEN WHEELS

BACKGROUND OF THE INVENTION

1. Field of the Invention

The present invention relates to a device for controlling brakes of a vehicle such as an automobile, and more specifically, to such a device that executes follow-up (or servo) control of braking force or braking pressure for individual wheels of a vehicle.

2. Description of Prior Art

Electronic controlled braking (ECB) systems are being commonly employed in modern vehicles such as automobile, establishing braking force balance or distribution for providing an appropriate driving condition. In these ECB systems, braking force on individual wheels are servo-controlled. Namely, an electronic controller first determines target values of braking force or braking pressure (in a hydraulic system) for individual wheels, taking into account actual running conditions in the vehicle such as wheel speeds, the vehicle's behavior, as well as a braking action of the driver. Then, under the control of the controller, braking force generating apparatuses for the wheels are operated to generate braking force or pressures so as to follow up the respective target values. In order to bring actual braking force or pressure values for individual wheels in conformity with the corresponding target values, the actual values are fed back to the inputs of the respective braking force generating apparatuses so as to modify the inputs for canceling any deviation of the actual value from the corresponding target value, as well known in the art (feedback control). Examples of devices of ECB type are seen in Japanese Laid-Open Patent Publications (JP) Nos. 2000-247219 and 2002-187537. Such a system is often referred to as brake by wire (BBW) control system because a demand for controlling braking force is transmitted through electrical harness from an input device responding to braking action by a driver, e.g. a brake pedal, to braking force generating apparatuses for the respective wheels.

In practical ECB systems, braking force generating apparatuses and/or components in a hydraulic circuit of a braking system associated therewith, such as flow metering valves, have differences in input and output response characteristics within tolerances, hindering the accurate controlling of braking force on the individual wheels and/or braking force distribution. As mentioned above, a deviation of an actual braking force or pressure value for each wheel from the corresponding target value, if any, can be cancelled through the feedback control of braking force individually executed for each wheel. This feedback process, however, is not instantaneous. Until the actual value reaches to the target value, i.e. under transient condition, the rates of variation of the actual values can differ from one another among the wheels, dependent upon the response characteristics of the components in the braking system, resulting in undesirable difference of braking force or unwanted braking force distribution. In other words, in the controlling of braking force on individual wheels for an appropriate driving condition, the feedback strategy so far can not eliminate the effects of the tolerances under transient condition.

Accordingly, a braking force control device for a vehicle may be improved more appropriately for providing an appropriate driving condition, especially under transient condition (during the variation of braking force) in conjunction with the input-out response characteristics of braking force-generating apparatuses for wheels and/or components in a hydraulic braking circuit associated therewith.

SUMMARY OF INVENTION

According to the present invention, there is provided a novel braking force control device for a vehicle so as to render actual braking force on wheels in conformity with target braking force, improved for overcoming the problem of tolerance of components in a braking system in conjunction with feedback strategy as described above. The vehicle, provided with the inventive control device, comprises at least a pair of left and right wheels, a braking system including apparatuses generating braking force on the respective wheels; at least one sensor monitoring an operational condition of the vehicle; and wheel sensors monitoring, and generating values corresponding to, braking force on the respective wheels. The inventive control device is designed to comprise a portion of determining target values corresponding to target braking force on the respective wheels in response to the operational condition of the vehicle; a portion of modifying at least one of the target values based upon a relation between the actual values of the left and right wheels; a portion of operating the braking force generating apparatuses based upon the modified target values.

In the conventional feedback control strategy as described above, an actual braking force or pressure value for a wheel is fed back only to the input of the corresponding braking force generating apparatus. That is, a control process for operating braking force generating apparatuses for each of left and right wheels are executed substantially independently of each other so that actual braking force values on the individual wheels could be varied at different rates due to a difference, if any even within a tolerance, in the response characteristics of the braking force generating apparatuses and/or components in a braking system associated therewith for the wheels. In this case, even when the same target value is given from a target value determining portion in a control device, actual braking force or pressure values of the left and right wheels can differ from each other until both actual values on the wheels reaches to the target value, undesirably biasing brake force balance toward either of the left and right wheels.

In the inventive control device, a relation between values corresponding to actual braking force on left and right wheels is fed back to at least one of the braking force generating apparatuses through the target value modification portion so as to cancel a difference of braking force between the wheels due to differences of the response characteristics of components in a braking system, avoiding or reducing undesirable braking force bias. In other words, a wider tolerance of components in a braking system is allowed than ever, reducing a cost for manufacturing a braking system. In the inventive device as described above, in practical, a target value for each wheel may be modified with a correction value calculated for the target value based upon a relation between values corresponding to actual braking force on the left and right wheels.

For a hydraulic braking system, typically, values corresponding to actual braking force, monitored with wheel sensors, may be braking pressure values in wheel cylinders of braking force generating apparatuses for individual wheels (in this case, the wheel sensors will be wheel cylinder pressure sensors.). As readily understood by one of ordinary skill in the art, in a hydraulic braking system, an assumption is considered as valid that one to one correspondence between braking pressure and braking force is established for the respective wheels, and therefore the control of braking force can be executed through processing braking pressure values. Alternatively, or for a non-hydraulic braking system, a value of braking force may be a braking force value or a slip ratio on a wheel, detected or estimated in an appropriate manner as known in the art. In this regard, it should be noted that the unit of target value may be appropriately determined in accordance with a selected actual value. If a monitored (actual) value is a braking pressure value, the corresponding target value will be given in pressure unit.

Preferably, for a relation between values corresponding to actual braking force on left and right wheels, a difference between actual braking force or pressure values of the left and right wheels is selected to be fed back to a portion in the control device of operating braking force generating apparatuses while multiplied by an appropriate feedback factor. Instead of such a difference, a ratio of actual values of the left and right wheels may be used.

The modification of target values may be executed for either or both of left and right wheels. If only one of target values is modified, the other of the target values is inputted intactly to the corresponding portion in the control device for operating the braking force generating apparatus. In this case, preferably, the target value of the side associated with components having the slower response characteristic is selectively modified, resulting in relatively quick correction of the difference of braking force. On the other hand, when both the target values are modified, the correction amount for the target value for each wheel can be made relatively small, advantageous for the stability of the operation of the control device. In accordance with the teaching of the present invention, one of ordinary skill can select whether either one of the target values is modified or both the target values are modified, taking into account the maximum allowable feedback amount (determined with a feedback gain) and the requirement of correction of braking force unbalance, i.e. the magnitude of tolerances of components in a braking system.

As well known in the art, in an ECB system, braking force values on individual wheels can be advantageously set out to as different values for providing an appropriate braking force balance between the left and right wheels, assisting the driving operation of a driver of a vehicle. It should be avoided that such an intended difference of braking force between left and right wheels is cancelled by an excessive feedback of a relation between actual braking force on left and right wheels.

Thus, in the inventive control device, the target value modifying portion may be designed to modify at least one of the target values based upon a relation between target values for left and right wheels as well as the relation between actual value of braking force on the left and right wheels, so as to ensure the generation of an intended braking force balance (Accordingly, in this case, the correction value to be applied for the modification of the target values will be calculated based upon the relation between the actual values and the relation between the target values.). In other words, the feedback of the relation between actual values is modified based upon the intended braking force balance so as to cancel a deviation of the actual braking force balance from the intended braking force balance.

It is important to be noted that the use of a relation between target values in the process enables the inventive feedback strategy to function irrespective of whether or not braking force balance is intended for an appropriate driving condition. Without a relation between target values, the inventive feedback strategy is less useful for a system in which braking force balance is intentionally made, because it is difficult to estimate deviation of an actual braking force balance from an intended braking force balance. In this case, when target values for left and right wheels differ from each other, it is required to interrupt the inventive feedback control. For a braking system of a type in which the same braking pressure is always applied to the left and right wheels, of course, the inventive feedback strategy is effective without using a relation between target values.

Preferably, for a relation between target values for left and right wheels, a difference of the target values is selected, which is subtracted from the difference between actual braking force or pressure values, and the resultant value is fed back to braking force generating apparatuses while multiplied by a negative feed back gain. Alternatively, a deviation of a actual value from the corresponding target value is first obtained for each wheel, and the difference of the deviations between the wheels may be fed back to the individual braking force generating apparatuses. Instead of such a difference of target values, a ratio of the target values may be used for the modification of feedback amounts.

In a four (or more)-wheeled vehicle, the inventive feedback strategy as described above may be executed for each of the pairs of front wheels and rear wheels.

In this regard, braking force distribution among front and rear wheels in a four-wheeled vehicle, in general, is controlled to be biased toward the front wheels. During braking of a four-wheeled vehicle, a rear wheel is liable to be locked due to the shrinkage of its frictional circle by the forward shifting of the load of the vehicle. The locking of a rear wheel prior to a front wheel induces serious deterioration of a vehicle running behavior, such as disturbance in the attitude and/or spinning of a vehicle body. Thus, for avoiding the locking of a rear wheel prior to a front wheel, the braking force distribution is controlled as described.

In the inventive control device, preferably, target values are set out for providing braking force distribution biased to front wheels. However, the feedback of a relation between actual values of braking force on left and right and/or a relation between the corresponding target values would deviate actual braking force distribution among the front and rear wheels from appropriate or intended distribution. This is because, as described above, the target values are modified for canceling any unintended balance of actual braking force before fed to the portion of operating braking force generating apparatuses. Thus, in order to avoid such a deviation of braking force distribution among front and rear wheels, the inventive feedback strategy may be further modified so as to keep an intended distribution.

Accordingly, the inventive control device may further comprise a portion of determining an actual braking force distribution ratio among the pairs of the front and rear wheels and an target braking force distribution ratio among the pairs of the front and rear wheels; and the target value modifying portion modifies the at least one of the target values based upon the actual and target braking force distribution ratios so as to bring the actual ratio close to the target ratio along with the modification for canceling unintended braking force balance between left and right wheels. When an actual braking force distribution ratio among front and rear wheels is more biased to the rear wheels compared to the corresponding target ratio, the at least one of the target values is modified so as to increase a ratio of the sum of the modified target values for the front wheels to the sum of the modified target values for the rear wheels, compared to a ratio of the sum of the target values for the front wheels to the sum of the target values for the rear wheels. On the other hand, when the actual braking force distribution ratio is more biased to the front wheels than the target braking force distribution ratio, the at least one of the target values is modified so as to decrease a ratio of the sum of the modified target values for the front wheels to the sum of the modified target values for the rear wheels, compared to a ratio of the sum of the target values for the front wheels to the sum of the target values for the rear wheels. In other words, when the actual braking force distribution among front and rear wheels is more biased to the rear wheels than the intended one, the target values are modified to increase for the front wheels and/or to decrease for the rear wheels. And, when the actual braking force distribution is more biased to the front wheels, the target values are modified to decrease for the front wheels and/or increase for the rear wheels. Accordingly, a deviation of actual braking force distribution from intended distribution will be canceled through the modification of the target values.

Preferably, the amount of modification in target values may be varied in accordance with a deviation of the braking force distribution ratio of actual braking force from the target ratio (before modified), resulting in a quick, but not excessive correction of the braking force distribution. It should be also noted that, for the canceling of a deviation of a braking force distribution ratio, not all target values must be modified.

In one embodiment, the modification of a set of target values in conjunction with braking force distribution among front and rear wheels can be accomplished by varying a gain for the feedback of a relation between actual value of braking force and/or a relation between the corresponding target values used in each of the modification processes of target values of the front and rear wheels.

Thus, it is an object of the present invention to provide new and novel devices for controlling brake force of a vehicle, rendering actual braking force on individual wheels in conformity with the corresponding target values for providing an appropriate driving apparatuses, employing a novel feedback strategy which improves the conventional feedback strategy in the controlling of braking force on the individual wheels.

It is another object of the present invention to provide such devices that reduces the influence of differences, even within tolerances, of response characteristics of braking force generating apparatuses and components in a braking system associated therewith, apparent especially during variation of braking force.

It is a further object of the present invention to provide such devices wherein any unintended difference of braking force between the wheels, especially occurring during transient condition of variation of braking force, is canceled or reduced through a novel feedback strategy.

It is another object of the present invention to provide such devices in which a relation between actual braking force of individual wheels are fed back to braking force generating apparatuses for correcting deviation of actual braking force balance from an appropriate or intended braking force balance.

It is a further object of the present invention to provide such devices that control braking force balance between left and right wheels while canceling or reducing a deviation of an actual braking force balance from an intended braking force balance and/or avoiding unwanted braking force balance between the wheels.

It is another object of the present invention to provide such devices that reduces or cancels an unwanted difference of braking force between left and right wheels while ensuring an appropriate braking force distribution among front and rear wheels for avoiding the locking of the rear wheels prior to the front wheels.

It is a further object of the present invention to provide such devices suitable for BBW system.

It is a further object of the present invention to provide such devices that moderate tolerances or limitations of allowable differences of response characteristics of braking force generating apparatus and/or components in a braking system, and thereby improving the yield factor in manufacturing products (reducing the number of wasted products because of the tolerances) and reducing the manufacturing cost for baking systems.

Other objects and advantages of the present invention will be in part apparent and in part pointed out hereinafter.

BRIEF DESCRIPTION OF THE DRAWINGS

In the accompanying drawings.

DESCRIPTION OF PREFERRED EMBODIMENTS

In the followings, several preferred embodiments of a vehicle braking force control device employing a novel feedback strategy of the present invention will be explained about in conjunction with a hydraulic ECB system. However, it should be noted that the present invention can be successfully applied in braking systems of the other type, such as electromagnetic braking system. Further, while the illustrated system is BBW hydraulic system in which a master cylinder is hydraulically isolated from wheel cylinder (in a mode of the controlling of braking force), the present invention may be applied for a braking system in which a master cylinder pressure is hydraulically transmitted to wheel cylinders. In addition to the inventive feedback control, preferably, braking force for each wheel is controlled so as to be rendered in conformity with the corresponding target value through a conventional servo- or feedback-control. However, the controlling of braking force for individual wheels may be of feed-forward type.

Hydraulic ECB System

Figure 1A:
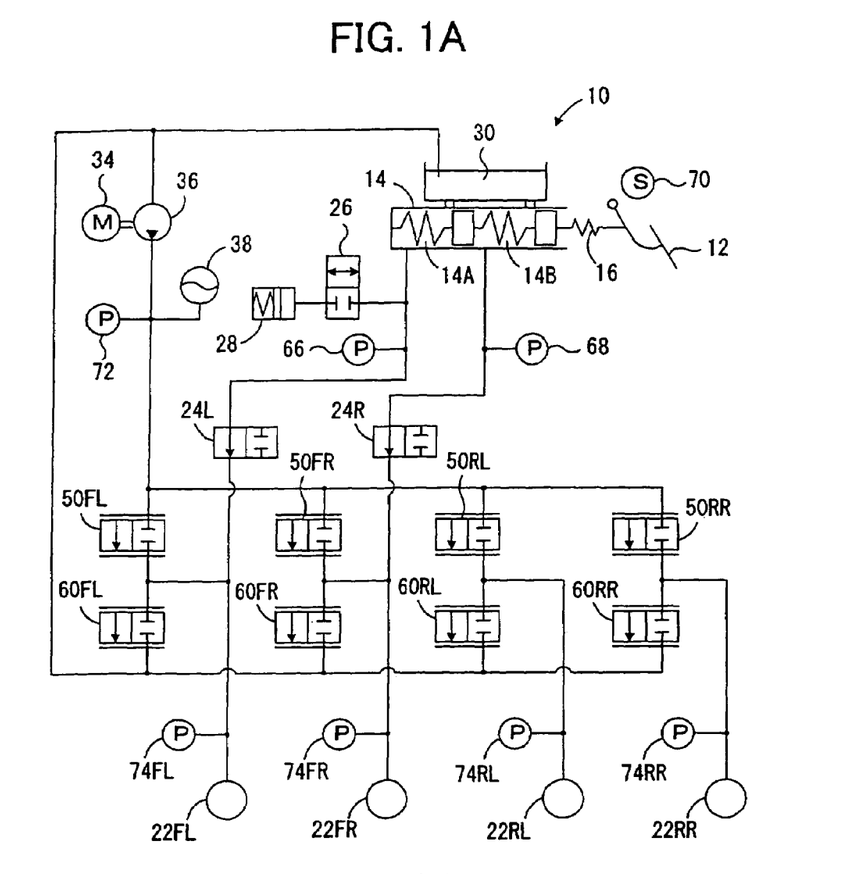
FIG. 1A is a schematic diagram of a hydraulic circuit in a braking force control device for a four-wheeled vehicle of a preferred embodiment according to the present invention.
Figure 1B:
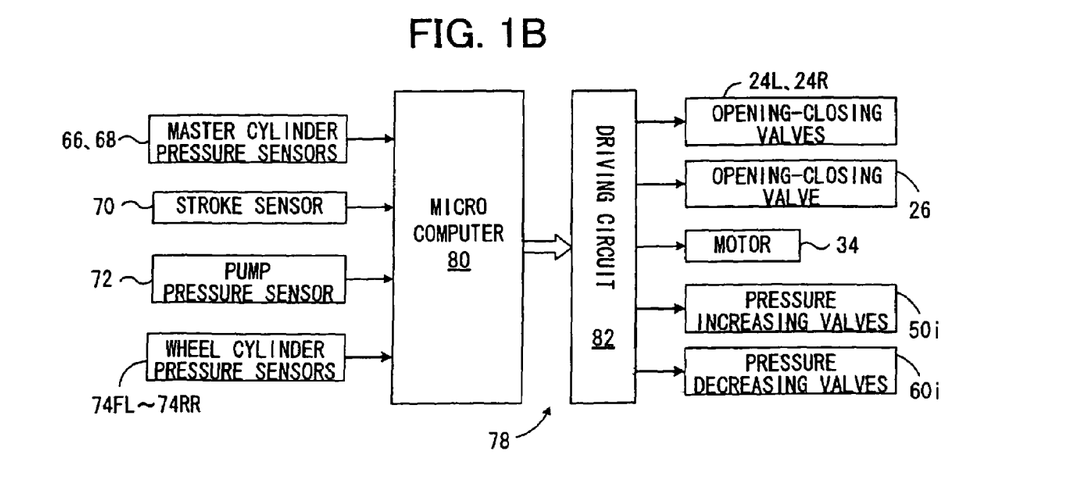
FIG. 1B is a schematic diagram of an electronic controller of a braking force control device for operating the components in the hydraulic circuit shown in FIG. 1A.

FIG. 1 illustrates a schematic diagram of a braking system in which an embodiment of a control device is implemented for controlling braking force on individual wheels according to the present invention, which braking system consists of a hydraulic circuit 10 (FIG. 1A), feeding a pressure to each of wheel cylinders 22$i$ (i=FL, FR, RL, RR=front-left, front-right, rear-left and rear-right wheels, respectively) in braking force generating apparatuses provided for the respective wheels (not shown); a demand input apparatus including a brake pedal 12, a master cylinder 14, etc.; and an electronic controller 78 (FIG. 1B) controlling brake fluid flows in the hydraulic circuit by operating solenoid valves and other components therein.

The illustrated system is of a partial BBW type. Namely, when the controlling of braking force on the individual wheels is not executed, the wheel cylinders for front wheels 22FL, FR are hydraulically exposed to the pressure in first and second master cylinder chambers 14A, B in the master cylinder 14 (master cylinder pressure) via two-state (opening and closing) normally opened solenoid valves 24L, R, respectively, as shown in FIG. 1A. In this mode, i.e. non-control mode, braking force on front wheels is simply changed in response to the depression of a brake pedal through the variation of the master cylinder pressure. This non-control mode is executed for failsafe, e.g. when any failure in the electronically controlled components as explained below in more details takes place, which mode is not relevant to the inventive feedback strategy.

In the control mode, the solenoid valves 24 are closed to hydraulically isolate the wheel cylinders 22FL, FR from the master cylinder 14, so that the system operates as a BBW system. As seen from FIG. 1A, each wheel cylinder 22$i$ is hydraulically connected between a motor (34)-driven oil pump 36 and a oil reservoir 30 via a pair of normally closed, solenoid, flow regulating valves 50$i$ and 60$i$, respectively. The pressures in each wheel cylinder 22$i$ is individually adjusted by operating the flow regulating valves 50$i$ (pressure increasing valve) and 60$i$ (pressure decreasing valve). Under the control of the electronic controller, the pressure increasing valve 50$i$ regulates the flow of fluid, pressurized with the motor (34)-driven oil pump 36, fed into the corresponding wheel cylinder 22$i$, and the pressure decreasing valve 60$i$ regulates the flow released from the wheel cylinder to a oil reservoir 30. Actual pressures in the wheel cylinders 22$i$ are monitored with wheel cylinder pressure sensors 74$i$, respectively. It should be noted that, in the illustrated system, braking pressures of the individual wheels can be regarded as monotonically corresponding to the respective braking force on the individual wheels so that braking force on each wheel can be controlled by processing braking pressure in the corresponding wheel cylinder.

Between the outlet of the pump and the pressure increasing valves 50$i$, an accumulator is provided for accumulating pressurized braking fluid discharged from the pump for stabilizing the pressure in the upstream of the flow regulating valves 50$i$. Although not shown in the drawing, the inlet and outlet of the pump is fluidly selectively connected via a relief valve, which opens when the pressure in the accumulator exceed a reference value, returning fluid from the outlet to the inlet of the pump.

As already noted, the illustrated system is of BBW type. Thus, in the control mode, the master cylinder 14 functions as a driver's demand input apparatus for converting a braking action, i.e. depression of the brake pedal 12, of a driver into electrical signal for the electronic controller. The exemplary master cylinder 14 is designed to include a dry stroke simulator 16, provided between the brake pedal 12 and master cylinder 14, and a wet stroke simulator 28, hydraulically connected to the master cylinder 14 via a two-state (opening and closing) solenoid valve 26 (normally dosed, but opened in the control mode), simulating responses of a braking pedal and a master cylinder pressure of a conventional hydraulic braking system. The pressures in the master cylinder chambers, monitored with master cylinder sensors 66 and 68, and stroke in the simulator 16, monitored with a stroke sensor 70, are used in the electronic controller 78 for determining target values for braking force on the individual wheels as described below in details.

Referring to FIG. 1B, the electronic controller 78 incorporates a microcomputer 80, which may be of an ordinary type including a central processor unit, a read only memory, a random access memory, input and output port means and a common bus interconnecting these elements (not shown). Through appropriate interfaces (not shown), the microcomputer 80 receives signals of master cylinder pressures Pm1, Pm2, from the master cylinder pressure sensors 66, 68; a signal of depression stroke St of the brake pedal 12 from the stroke sensor 70; a signal of accumulator pressure Pa from an accumulator pressure sensor 72 and signals of wheel cylinder pressures Pbi form the wheel cylinder pressure sensors 74$i$. Then, based upon those signals, the microcomputer 80 determines target values (target braking pressure values Pti in this embodiment) for the individual wheels; modifies a set of the target values into a set of modified target values; and operates the valves, pumps, etc. through a driving circuit device 82 in accordance with a control flow incorporating the inventive feedback strategy and related data, memorized in the microcomputer, as explained about later. Optionally, not shown in the drawing, other signals of indicating operational condition of the vehicle, such as wheel speeds; the speed, acceleration and yaw rate of vehicle body, etc. may be inputted to the microcomputer for determining target values for the individual wheels for an appropriate control of the vehicle behavior as known in the art.

It is to be understood that FIG. 1A shows a condition in the non-control mode, in which all components to be controlled electrically in the hydraulic circuit are inactivated: the solenoid valves 24L, R are opened and thereby the braking force or pressure on the front wheels is hydraulically controlled with the master cylinder. In the control mode, the valves 24 L, R are closed and the pump is energized. Then, the opening of each of the flow regulating valves 50$i$ and 60$i$ is individually regulated with the electrical controller through the driving circuit 82, so that braking force on the individual wheels can be adjusted independently of one another, allowing the controlling of braking force balance between left and right wheels and braking force distribution among front and rear wheels.

In hydraulic ECB system as illustrated, flow regulating valves 50$i$ and 60$i$ have different input and output response characteristics within a tolerance. Thus, the flow rates of braking fluid passing through the valves can be different among one another even if the same excitation or driving current is fed to solenoids. In this regard, braking pressure Phi in each wheel cylinder is servo-controlled, and therefore, even in the presence of the difference of response characteristics in the valves, braking pressures Pbi for the individual wheels will be brought finally in conformity with the corresponding target values Pti through the servo control of braking pressure for each wheel.

Before an actual braking pressure value reaches its target value, however, instantaneous braking pressure values Phi may be different from one another due to the difference of response characteristics of the valves even when the same target value is set out for the wheels. This is because the individual feedback control for each wheel refers to only the corresponding target value. The differences of flow rates through valves and/or the differences of the rates of response to an input in the left and right will result in a transient unintended braking force differences or unbalance, which causes the deterioration of the stability of the vehicle behavior. That is, a conventional feedback strategy successfully provides an appropriate or intended braking force balance in a steady state, but not under transient condition.

The inventive feedback strategy as described below can provide an appropriate or intended braking force balance even under transient condition of variation of braking force.

Hereinafter, the control with the inventive feedback strategy is referred to as "Communication Control" because the controls of braking force for individual wheels are mutually communicated through the inventive feedback of a relation between braking force or pressure values of the left and right wheels. In other words, control systems for individual wheels exchange the information of actual braking force with one another through the inventive feedback strategy.

Communication Control Between Left and Right Wheels

Figure 2:
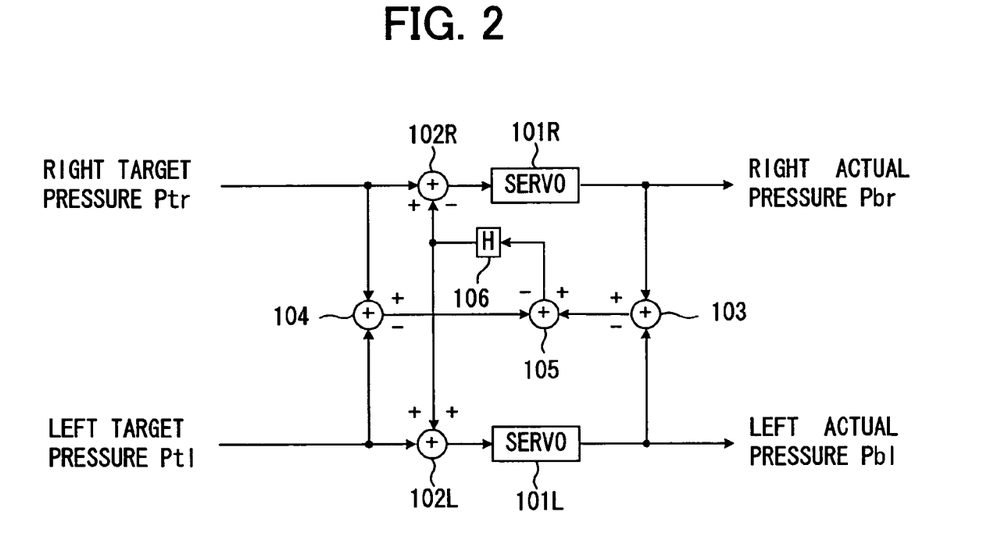
FIG. 2 is a control block diagram of the first embodiment of the present invention.

FIG. 2A shows a control block diagram of a first embodiment of communication control for a pair of left and right wheels according to the present invention. In this embodiment, the communication control is executed for the front and rear wheels in the same way, independently. Thus, first, the control for one pair of wheels will be explained about in the followings.

As seen from the diagram, target values Ptl, Ptr for left and right wheels, which may be determined in an appropriate process as known in the art, are fed to the respective servo-control blocks 101L, R via the respective summers 102L, R. The servo-control blocks 101L, R, outputting actual braking pressure values of the left and right wheels, Pbl, Pbr, may be of a conventional type operating independently of each other, e.g., where a deviation of an actual braking pressure from its target value is fed back to the input of the servo system (Although not shown for clarity of the drawing, each target values, Ptl, Ptr is directly fed to the corresponding servo block 101L, R for the individual feedback process.). In the communication control shown here, moreover, the relation between actual left and right values Pbl, Pbr, and the relation between the target values Ptl, Ptr, are fed back to the servo control blocks 101L, R via the summers 102L, R.

More specifically, firstly, the difference between the actual left and right values: $\Delta Pb = Pbl - Pbr$ (at a summer 103) and the difference between the target left and right values: $\Delta Pt = Ptl - Ptr$ (at a summer 104) are calculated. Then, the difference $\Delta Pd = \Delta Pb - \Delta Pt$ (at a summer 105) is added into the summers 102L, R while multiplied with the respective feedback gains $K1l = -K1$, $K1r = K1$ (at a multiplier 106), respectively. Thus, the inputs of the servo control blocks are modified as follows:

$$Ptl + \Delta Pcl = Ptl - K1 \cdot \Delta Pd = Ptl - K1 \cdot (\Delta Pb - \Delta Pt) \text{ [for left wheel]} \quad (1a)$$

$$Ptr + \Delta Pcr = Ptr + K1 \cdot \Delta Pd = Ptl + K1 \cdot (\Delta Pb - \Delta Pt) \text{ [for right wheel]} \quad (1b),$$

where $\Delta Pcl$, $\Delta Pcr$ are correction values for the left and right wheels. The feedback gain K1 may be a non-zero positive constant between 0 and 0.5, which may be determined experimentally or theoretically. For the feedback gains, different values may be used between the left and right wheels: $K1l \neq -K1r$ (see a second embodiment described below.).

Accordingly, for instance, if the actual value for left wheel is larger than that for the right wheel ($\Delta Pd > 0$), the left and right target values are modified to be decreased and increased, respectively, so that unintended difference between the actual values, if any, can be reduced or cancelled. The reason of subtracting $\Delta Pt$ is for avoiding nullification of any intended difference between the left and right wheels, e.g. in a control process during the turning of a vehicle.

In other words, since the above expressions (1a, b) are equivalent to the following expressions:

$$Ptl - K1 \cdot \{(Pbl - Ptl) - (Pbr - Ptr)\} \text{ [for left wheel]} \quad (1a)'$$

$$Ptr + K1 \cdot \{(Pbl - Ptl) - (Pbr - Ptr)\} \text{ [for right wheel]} \quad (1b)'$$

Thus, it can be understood that, in this communication control, the difference between the left and right deviations of the actual values from the corresponding target values is reduced or cancelled, correcting an unwanted difference of braking force between the left and right wheels, caused by allowing a difference of response characteristics of the flow regulating valves within a tolerance.

It should be noted that the above feedback vanishes in absence of unwanted braking force balance, i.e. when the difference between the left and right deviations of the actual values from the corresponding target values vanishes.

In a system where target values for left and right wheels are always identical, the term $\Delta Pt$ is not required. Thus, $\Delta Pcl$, $\Delta Pcr$ will be:

$$\Delta Pcl = -K1 \cdot \Delta Pb \text{ [for left wheel]} \quad (2a)$$

$$\Delta Pcr = +K1 \cdot \Delta Pb \text{ [for right wheel]} \quad (2b),$$

Further, if the communication control is executed only when a vehicle runs on a straight way or if the communication control should not be executed during the turning of a vehicle, $\Delta Pcl$, $\Delta Pcr$ will be set out as (2a, 2b) only when target values for left and right wheels are identical, and otherwise, $\Delta Pcl$, $\Delta Pcr$ may be nullified.

In a system where a relation between target value is not fed back to the servo control blocks, the calculation of $\Delta Pcl$, $\Delta Pcr$ is executed as (2a, 2b) only when Ptl=Ptr. When Ptl≠Ptr, $\Delta Pd$, $\Delta Pcr$ in the previous cycle may be used.

In the above communication control, $\Delta Pcl$, $\Delta Pcr$ may be determined based upon a ratio of actual braking pressure values Pbl/Pbr and/or a ratio of target actual values, Ptl/Ptr. In this case, $\Delta Pcl$, $\Delta Pcr$ may be:

$$\Delta Pcl = -K2 \cdot Ptl \cdot \log(Pbl/Pbr \cdot Ptr/Ptl). \quad (3a)$$

$$\Delta Pcr = +K2 \cdot Ptr \cdot \log(Pbl/Pbr \cdot Ptr/Ptl) \quad (3b),$$

where K2 is a feedback gain.

Further, when the relation between the target value is not used, $$\Delta Pcl = -K2 \cdot Ptl \cdot \log(Pbl/Pbr). \quad (4a)$$

$$\Delta Pcr = +K2 \cdot Ptr \cdot \log(Pbl/Pbr) \quad (4b),$$

The feedback gain K2 is a non-zero positive constant between 0 and 0.5, which may be determined experimentally or theoretically.

Figure 3:
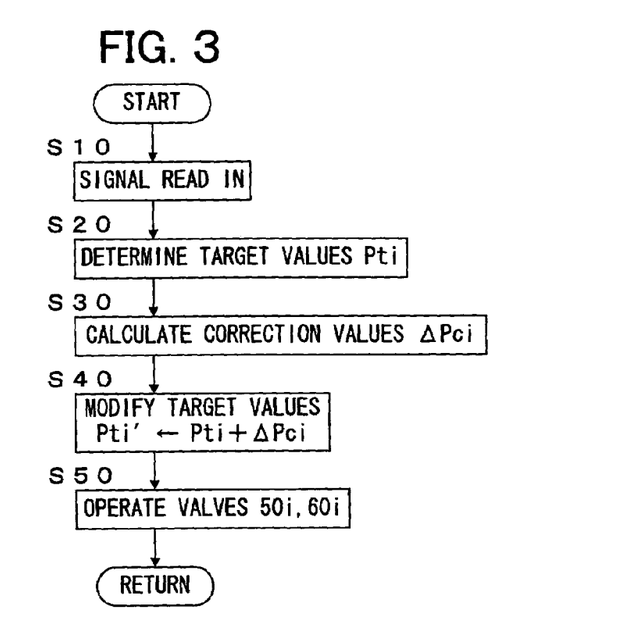
FIG. 3 is an example of a flowchart executed in a braking force control device of the first embodiment of the present invention.

As described briefly in conjunction with FIG. 1B, practically, the above-mentioned communication control process is executed in the electronic controller 78 with a recursive control routine programmed therein. Hereinafter, referring to FIG. 3, the operation of this embodiment of the inventive braking force control device will be described. The control according to a control routine shown in FIG. 3 is started by a closure of an ignition switch (not shown) and cyclically repeated at a cycle time such as several milliseconds during the operation of the vehicle.

Firstly, in step 10, the signals shown in FIG. 1B and data and/or parameters required in the following steps including those for calculation of target values are read in.

Figure 4A:
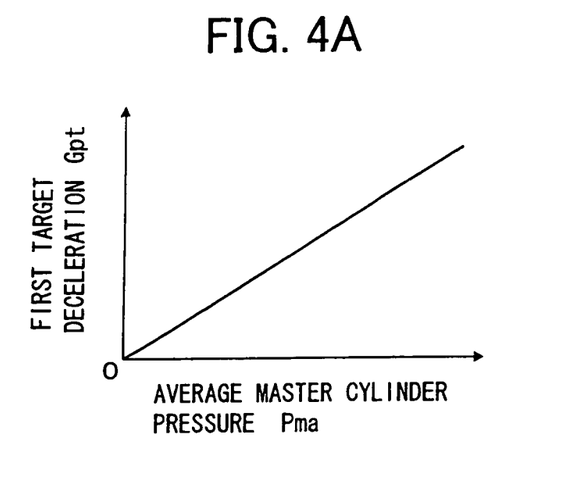
FIG. 4A show a map of first target deceleration Gpt vs. average master cylinder pressure Pma, used for the determination of target values.
Figure 4B:
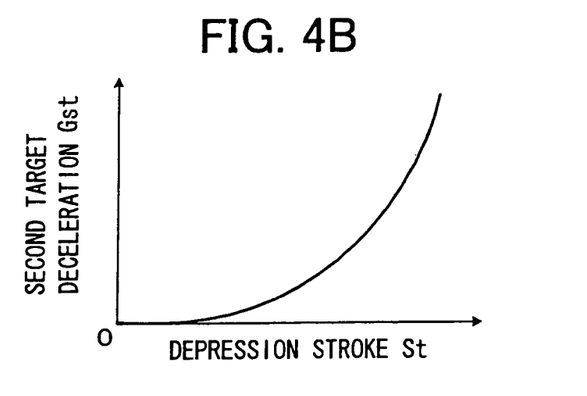
FIG. 4B shows a map of second target deceleration Gst vs. depression stroke St, used for the determination of target values.
Figure 4C:
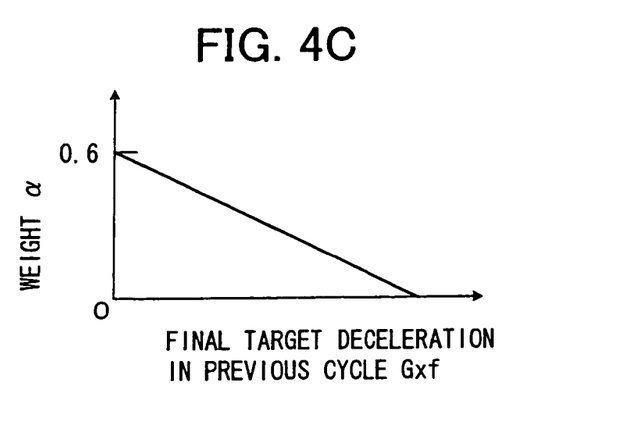
FIG. 4C shows a map of weight a for final target deceleration vs. final target deceleration in the previous cycle, used for the determination of target values.

In step 20, target values, Pti, for front left and right and rear left and right wheels are determined in an appropriate way known in the art. For instance, target braking pressure values may be obtained as follows: First, a first target deceleration Gpt of a vehicle body is determined using a map as shown in FIG. 4A based upon an average value Pma of the master cylinder pressures Pm1 and Pm2; and a second target deceleration Gst of the vehicle body is determined using a map as shown in FIG. 4B based upon the depression stroke St. Then, a final target deceleration Gft is calculated by:

$$Gft = Gpt + \alpha \cdot Gst,$$

where $\alpha$ is a weight factor for the second target value, determined using a map as shown in FIG. 4C based upon the final deceleration Gft in the previous cycle (As seen from the map, $\alpha$ is decreased from 0.6 as Gft increases. See the aforementioned JP 2002-187537 for details.). The resultant Gft is a simulated value of a deceleration demanded by the driver of the vehicle through depressing the brake pedal. Then, based upon the resultant Gft, the target values, Pti, for the individual wheels are determined. In this determination process, different target pressure values may be determined for the individual wheels so as to provide an appropriate braking force balance for stabilizing an vehicle running behavior, using parameters indicating an actual vehicle behavior, such as actual longitudinal and/or lateral decelerations, yaw rate, etc.

Then, in step 30, correction values for the individual wheels $\Delta Pcfl$, $\Delta Pcfr$, $\Delta Pcrl$ and $\Delta Pcrr$ are determined in accordance with the communication control as described, e.g. as follows:

$$\Delta Pcfl = -K1 \cdot \{(Pbfl - Ptfl) - (Pbfr - Ptfr)\}$$

$$\Delta Pcfr = K1 \cdot \{(Pbfl - Ptfl) - (Pbfr - Ptfr)\}$$

$$\Delta Pcrl = -K1 \cdot \{(Pbrl - Ptrl) - (Pbrr - Ptrr)\}, \text{ and}$$

$$\Delta Pcrr = K1 \cdot \{(Pbrl - Ptrl) - (Pbrr - Ptrr)\} \quad (5).$$

$\Delta Pci$ may be calculated as shown in expressions (2a, b)-(4a, b). It should be noted that feedback gains for the front and rear wheels may be different from one another. See a second embodiment described below.

Then, in step 40, the target values Pti are modified by adding the corresponding correction values $\Delta Pci$ thereto, as $Pti' = Pti + \Delta Pci$.

In step 50, based upon the resultant modified target values Pti', the flow regulating valves 50i and 60i are operated. It should be noted that the resultant modified target values Pti' are processed as the inputs of the corresponding servo blocks as shown in FIG. 2. Thus, the modified target values are further modified through the feedback process for the individual wheels as known in the art. Then, excitation current values determined in the electronic controller are fed through the driving circuit 82 for operating the individual solenoid valves. Thereafter, the control routine returns to Start.

While, in the above control process, target braking pressure values of the opposite sides are modified, it is possible to modify only target values of one side having a slower response characteristic. The detailed control routine for the modification of target values only in one side can be readily realized by one of ordinary skill in the art in accordance with the teaching of the present invention, and therefore, although not shown here, such modification of communication control should be considered to be included within the scope of the present invention.

If any failure occurs in components in the electronic controller or sensors required for the feedback process, the above-mentioned communication control is ceased. Then, the valves 24L, R are opened so that the braking of the vehicle is controlled directly by the master cylinder pressure.

Communication Control with Braking Force Distribution Among Front and Rear Wheels In the first embodiment as described above, the communication controls for front pair and rear pair of wheels are independent. Thus, actual braking force distribution among the front and rear wheels, namely, the ratio of braking force values between the front and rear wheels can deviate from an intended distribution, namely the ratio of target values between the front and rear wheels. This is because the target values inputted to the servo control blocks are modified for canceling unwanted difference of braking force between the left and right wheels.

Thus, in the second embodiment of the present invention as described below, communication controls are modified so as to bring actual ratio of braking force between the front and rear wheels in conformity with its target ratio. In order to accomplish this, the feedback gains used in the calculation of correction values $\Delta Pci$ are varied depending upon the relation between actual and target ratios of braking force.

Figure 5:
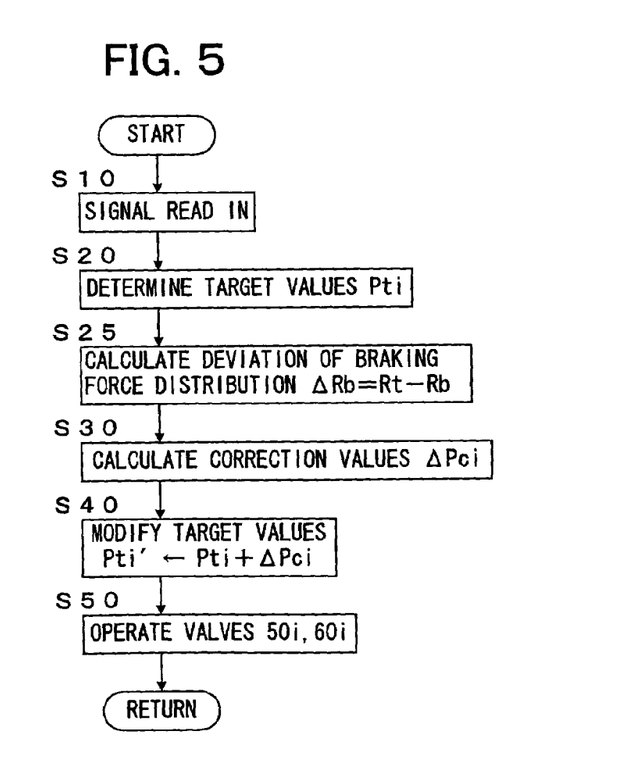
FIG. 5 an example of a flowchart executed in a braking force control device of the second embodiment of the present invention.

FIG. 5 shows a control routine of the second embodiment, similar to FIG. 3 except that, after determining target values, step 25 is executed in which a deviation of braking force distribution among the front and rear wheels are determined, and, in step 30, correction values $\Delta Pci$ are determined while changing feedback gains Ki for the individual wheels based upon the deviation of braking force distribution.

In step 25, first, the ratio of the sum of braking pressure values of the front left and right wheels to the sum of braking pressure values of the rear left and right wheels is calculated each for the target and actual values, Rt, Rb, respectively, as follows:

$$Rt = (Ptfl + Ptfr)/(Ptrl + Ptrr), \quad (6a)$$

$$Rb = (Pbfl + Pbfr)/(Pbrl + Pbrr). \quad (6b)$$

Then, the deviation of these ratios $\Delta Rb$ is determined as $\Delta Rb = Rt - Rb$. $\Delta Rb > 0$, when actual braking force distribution is more biased to the rear wheels than target distribution, and $\Delta Rb < 0$, when actual braking force distribution is more biased to the front wheels than target distribution.

In step 30, $\Delta Pci$ may be calculated as shown in expressions (1a, b)-(4a, b) as in the first embodiment, but $\Delta Rb$ is taken into account.

In the simplest way, if ΔRb>0, only a positive correction value of ΔPcfl and ΔPcfr and a negative correction value of ΔPcrl and ΔPcrr are selected to be used for the modification of the target values Pti. In other words, a negative correction value for the front wheels and a positive correction value for the rear wheels or K1 for those values are nullified. Then, the total front braking pressure is increased while the total rear braking pressure is decreased, resulting in that actual braking force distribution being shifted toward the front wheels. If ΔRb<0, a positive correction value for the front wheels and a negative correction value for the rear wheels or K1 for those values are nullified, resulting in that the decrease of the total front braking pressure and the increase of the total rear braking pressure, and thereby actual braking force distribution is shifted toward the rear wheels. If ΔRb=0, all correction value ΔPci are used (Practically, when the magnitude of ΔRb is smaller than a certain positive small constant, e.g. ~0.1, ΔRb may be regarded as 0.

Figure 6A:
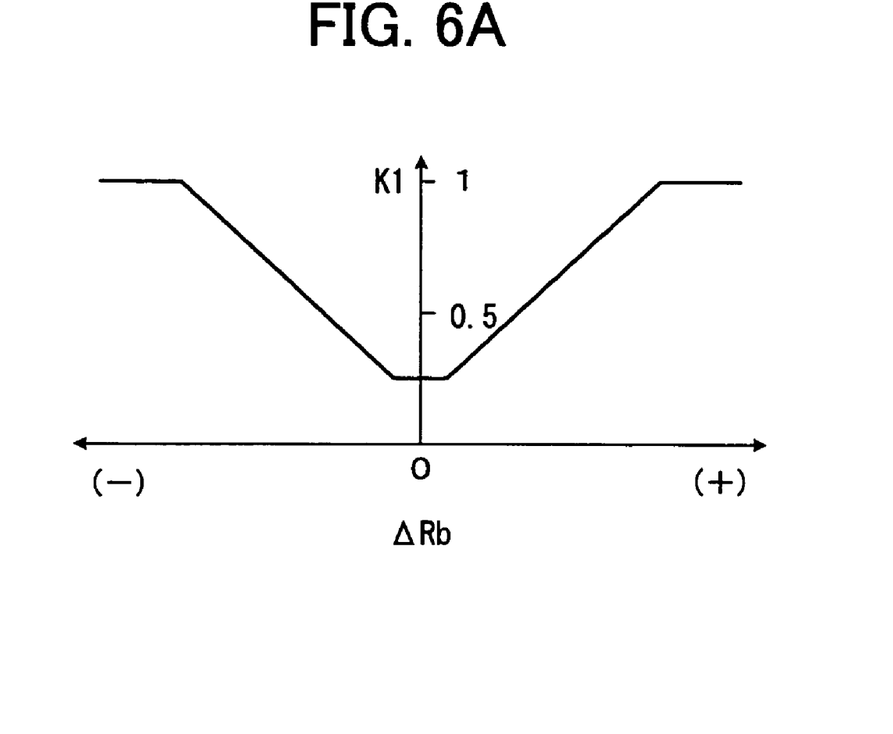
FIG. 6A shows a map of feedback gain K1 vs. deviation of braking force ratio of front wheels to rear wheels.

The feedback gain K1 in the above process may be a function of the magnitude of ΔRb: preferably, K1 increases as the magnitude of ΔRb increases as shown in FIG. 6A. Then, the absolute value of the effective (non-nullified) correction value ΔPci are increased, resulting in a fast correction of a deviation of braking force distribution.

By the way, the direction of an unwanted difference of braking force between left and right wheels due to tolerance of response characteristics of valves are relatively fixed once those valves are installed in a braking system. In such a case, correction values for the individual wheels may be determined using feedback gains variable depending upon the magnitude of ΔRb.

Figure 6B:
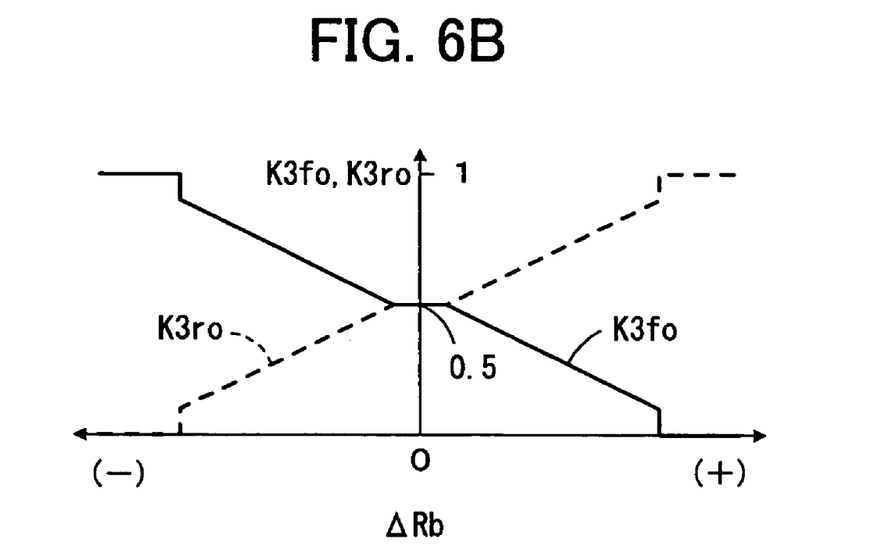
FIG. 6B shows a map of parameters for feedback gains K3$fo$, K3$ro$ vs. deviation of braking force ratio of front wheels to rear wheels.

Here, it is assumed that the differences of braking pressure values between left and right wheels, ΔPdf, ΔPdr, for front and rear wheels are always positive, namely, the left braking pressures each for front and rear wheels tend to become larger than the corresponding right braking pressures. In this case, after the determination of ΔRb, in step 30, parameters for feedback gains K3$fo$, K3$ro$, positive values varying between 0 and 1, are determined for the front and rear wheels, respectively, using a map as shown in FIG. 6B. (In FIG. 6B, feedback gains K3$fo$, K3$ro$ are indicated by solid and broken lines, respectively.) Then, feedback gains K3$i$ for the individual wheels, respectively, are determined as follows:

$K3fl = -K3fo$ $K3fr = 1 - K3fo$ $K3rl = -K3ro$ $K3rr = 1 - K3ro$ \hfill (7)

These feedback gains K3$i$ are used for calculating the correction values ΔPci for the individual wheels, e.g. as follows:

$\Delta Pcfl = K3fl \cdot \Delta Pdf$ $\Delta Pcfr = K3fr \cdot \Delta Pdf$ $\Delta Pcrl = K3rl \cdot \Delta Pdr$ $\Delta Pcrr = K3rr \cdot \Delta Pdr$ \hfill (8).

ΔPci may be calculated as shown in expressions (2a, b)-(4a, b).

In the above process, the sum of the correction values each for the front and rear wheels will be:

$\Delta Pcfl + \Delta Pcfr = (1 - 2K3fo) \cdot \Delta Pdf$ $\Delta Pcrl + \Delta Pcrr = (1 - 2K3ro) \cdot \Delta Pdr$ \hfill (9)

where, ΔPdf, ΔPdr>0 and, if ΔRb>0, then K3$fo$<0.5<K3$ro$, referring to a map in FIG. 6B. So, ΔPcfl+ΔPcfr>0>ΔPcrl+ΔPcrr, realizing that the total of the inputs of the front servo control blocks, i.e. the sum of the modified front target values increases, compared to their original target values, and the total of the inputs of the rear servo control blocks is decreased, which will correct ΔRb>0, i.e. the excessive distribution biased to the rear wheel. Similarly, if ΔRb<0, K3$fo$>0.5>K3$ro$ so that ΔPcfl+ΔPcfr <0<ΔPcrl+ΔPcrr, shifting the distribution toward the rear wheels.

Further, according to the use of the map in FIG. 6B, the magnitude of the sum of correction values increases as the magnitude of ΔRb increases, so that the deviation of braking force distribution can be corrected faster. In this connection, as seen from FIG. 6B, when the magnitude of ΔRb exceeds a certain value, K3$i$ may be 0 or 1.

Alternatively, for increasing the speed of the control process, discretely changing feedback gains may be used. For instance, under the assumption as described above, when the magnitude of ΔRb is within a small range, i.e. nearly equal to zero, Kfo and Kro is set to 0.5 (accordingly, all K3$i$ are 0.5.). If ΔRb>0, K3$fo$ and K3$ro$ each are set to K3$f$H and K3$r$L; if ΔRb<0, K3$fo$ and K3$ro$ each are set to K3$f$L and K3$r$H, where K3$f$H and K3$r$H are positive constants higher than 0.5 but lower than 1, and K3$f$L and K3$r$L are positive constants lower than 0.5.

The map of FIG. 6B and K3$f$H, etc. may be determined experimentally and/or theoretically. The tendency of the direction of the difference of braking force or pressure may be determined during or after manufacturing an involved braking system.

Although the present invention has been described in detail with respect to preferred embodiments thereof, it will be apparent for those skilled in the art that other various modifications are possible with respect to the shown embodiments within the scope of the present invention.

For instance, target values are modified by multiplying a factor determined of a correction value, determined based upon a relation between actual values of braking force on left and right wheels and a relation between the corresponding target values, with the target values. Further, feedback gains may be varied based upon a ratio between an actual braking force distribution ratio and a target braking force distribution ratio, instead of the difference thereof ΔRb.

The invention claimed is:

1. A device for controlling braking force for a vehicle having at least a pair of left and right wheels, a braking system including apparatuses generating braking force on the respective wheels, at least one sensor monitoring an operational condition of the vehicle and wheel sensors monitoring, and generating values corresponding to actual braking force on the respective wheels so as to render actual braking force in conformity with target braking force on the respective wheels; the device comprising:

a target value determining portion that determines target values corresponding to target braking force on the respective wheels in response to the operational condition of the vehicle;

a target value modifying portion that modifies at least one of the target values based upon a difference between the actual values of the left and right wheels; and a braking force generating apparatus operating portion that operates the braking force generating apparatuses based upon the modified target values, wherein the target value modifying portion modifies at least one of the target values for braking force on the respective wheels based upon the difference between the actual values of braking force on the left and right wheels and a difference between the target values of braking force for the left and right wheels.

2. A device of claim 1, wherein the target value modifying portion modifies the at least one of the target values with a correction value calculated for the at least one of the target values based upon the difference between the actual values of braking force on the left and right wheels.

3. A device of claim 1, wherein the at least one of the target values is modified so as to feed back the difference between the actual values of braking force on the left and right wheels into inputs of the braking force generating apparatuses.

4. A device of claim 1, wherein the target value modifying portion modifies the at least one of the target value with a correction value calculated for the at least one of the target values based upon the difference between the actual values on the left and right wheels and the difference between the target values for the left and right wheels.

5. A device of claim 1, wherein the at least one of the target values is modified so as to feed back the difference between the actual values on the left and right wheels and a difference between the target values for the left and right wheels into inputs of the braking force generating apparatus.

6. A device of claim 1, wherein the at least a pair of left and right wheels comprises a pair of front left and right wheels and a pair of rear left and right wheels, wherein the device further comprises an actual braking force distribution ratio determining portion that determines an actual braking force distribution ratio among the pairs of the front and rear wheels and a target braking force distribution ratio among the pairs of the front and rear wheels; and the target value modifying portion modifies the at least one of the target values based upon the actual and target braking force distribution ratios so as to bring the actual ratio close to the target ratio.

7. A device of claim 6, wherein, when the actual braking force distribution ratio is more biased to the rear wheels than the target braking force distribution ratio, the at least one of the target values is modified so as to increase a ratio of a sum of the modified target values for the front wheels to a sum of the modified target values for the rear wheels, compared to a ratio of a sum of the target values for the front wheels to a sum of the target values for the rear wheels.

8. A device of claim 6, wherein, when the actual braking force distribution ratio is more biased to the front wheels than the target braking force distribution ratio, the at least one of the target values is modified so as to decrease a ratio of a sum of the modified target values for the front wheels to a sum of the modified target values for the rear wheels, compared to a ratio of a sum of the target values for the front wheels to a sum of the target values for the rear wheels.

9. A device of claim 7, wherein, as the deviation of the actual braking force distribution ratio from the target braking force distribution ratio increases, an absolute value of a modification amount for the at least one of the target values increases.

10. A device of claim 8, wherein, as the deviation of the actual braking force distribution ratio from the target braking force distribution ratio increases, an absolute value of a modification amount for the at least one of the target values increases.

11. A device for controlling a braking force of a vehicle that includes at least a pair of left and right wheels; a braking system including apparatuses that generate a braking force on the respective wheels; at least one sensor monitoring an operational condition of the vehicle; and wheel sensors that monitor and generate values corresponding to an actual braking force on the respective wheels in order to render, on the respective wheels, an actual braking force in conformity with a target braking force corresponding to each of the respective wheels; the device comprising:

a target braking force value determining portion, the target braking force value determining portion determining target braking force values for the respective wheels in response to the operational condition of the vehicle;

a target braking force value modifying portion, the target braking force value modifying portion modifying at least one of the target braking force values based on a difference between the actual braking force values on the left and right wheels; and a braking force operating portion, the braking force operating portion operating the braking force generating apparatuses based upon the at least one modified target braking force value.

12. A method for controlling a braking force of a vehicle that includes at least a pair of left and right wheels; a braking system including apparatuses that generate a braking force on the respective wheels; at least one sensor monitoring an operational condition of the vehicle; and wheel sensors that monitor and generate values corresponding to an actual braking force on the respective wheels in order to render an actual braking force in conformity with a target braking force for the respective wheels; the method comprising:

determining target braking force values for the respective wheels in response to the operational condition of the vehicle;

determining a difference between the actual braking force values of the left and right wheels;

modifying at least one of the target braking force values based on the determined difference; and operating the braking force generating apparatuses of the vehicle based upon the at least one modified target braking force value.

13. A method according to claim 12, wherein modifying at least one of the target braking force values comprises modifying the at least one of the target braking force with a correction value calculated for the at least one of the target braking force values based upon the difference involving the actual braking force values on the left and right wheels.

14. A method according to claim 12, wherein modifying at least one of the target braking force values comprises modifying the at least one of target braking force value so as to feed back, as an input to at least one of the braking force generating apparatuses, the difference between the actual braking force values on the left and right wheels.

15. A method according to claim 12, wherein modifying at least one of the target braking force values comprises modifying the at least one of the target braking force values with a correction value calculated for the target value based upon the difference involving the actual braking force values of the actual braking force on the left and right wheels and the target braking force values for the left and right wheels.

16. A method according to claim 15, wherein modifying at least one of the target braking force values comprises modifying the at least one of the target braking force values so as to feed back the difference between the actual braking force values on the left and right wheels and a difference between the target braking force values for the left and right wheels into inputs of the respective ones of the braking force generating apparatuses.

17. A method according to claim 12, wherein the vehicle includes a pair of front left and right wheels and a pair of rear left and right wheels, wherein the method further comprises determining an actual braking force distribution ratio among the pairs of the front and rear wheels and a target braking force distribution ratio among the pairs of the front and rear wheels; and modifying at least one of the target braking force values comprises modifying the at least one of the target braking force values based upon the determined actual and target braking force distribution ratios so as to bring the actual ratio close to the target ratio.

18. A method of claim 17, wherein when the actual braking force distribution ratio is more biased to the rear wheels than the target braking force distribution ratio, modifying at least one of the target braking force values comprises modifying the at least one of the target braking force values so as to increase a ratio of a sum of the modified target braking force values for the front wheels to a sum of the modified target values for the rear wheels, compared to a ratio of a sum of the target braking force values for the front wheels to a sum of the target braking force values for the rear wheels.

19. A method of claim 17, wherein, when the actual braking force distribution ratio is more biased to the front wheels than the target braking force distribution ratio, modifying at least one of the target braking force values comprises modifying the at least one of the target braking force values so as to decrease a ratio of a sum of the modified target braking force values for the front wheels to a sum of the modified target braking values for the rear wheels, compared to a ratio of a sum of the target values for the front wheels to a sum of the target values for the rear wheels.

* * * * *